3,234,219
5-NITRO-FURYL-(2)-METHYLIDENE HYDRAZIDES
Paul Schmidt, Therwil, and Kurt Eichenberger and Max Wilhelm, Basel, Switzerland, assignors to Ciba Corporation, a corporation of Delaware
No Drawing. Filed Jan. 3, 1961, Ser. No. 88,589
Claims priority, application Switzerland, Jan. 4, 1960, 113/60; Apr. 5, 1960, 3,804/60; Nov. 17, 1960, 12,906/60
12 Claims. (Cl. 260—240)

The present invention provides 5-nitrofuryl-(2)-methylidene hydrazides of monocyclic, six-membered diazine carboxylic acids whose ring nitrogen atoms are separated by at most 1 carbon atom, if desired of their quaternary ammonium derivatives and salts thereof, and a process for their preparation.

As diazine-carboxylic acids of the above-defined type pyridazine or pyrimidine carboxylic acids are especially suitable and their derivatives whose nuclei are wholly or partially hydrogenated.

A special object of the invention is the manufacture of pyridazine-carboxylic acid-N'-[5-nitrofuryl-(2)-methylidene]-hydrazides, of their derivatives whose hetero nucleus is wholly or partially hydrogenated, if desired of their quaternary ammonium derivatives and of salts thereof. In these compounds the carboxylic acid hydrazide group is preferably attached to a carbon atom of the hetero nucleus, above all in position 3 of the pyridazine ring.

The new compounds may be substituted in any desired manner. More especially the heterocyclic nucleus may contain further substituents; primarily, it may be N-substituted and/or C-substituted, for example by unsubstituted or substituted hydrocarbon radicals, or by saturated or unsaturated heterocyclic or heterocyclic aliphatic groups.

Hydrocarbon radicals are, for example, saturated or unsaturated aliphatic, alicyclic, alicyclic-aliphatic, araliphatic or aromatic hydrocarbon radicals, such as lower straight or branched alkyl or alkenyl radicals, for example methyl, ethyl, propyl, isopropyl, straight or branched radicals linked in any desired position, being butyl, pentyl, hexyl or heptyl, allyl or methallyl radicals, cycloalkyl or cycloalkenyl radicals such as cyclopentyl, cyclohexyl, cycloheptyl, cyclopentenyl, cyclohexenyl radicals, cycloalkyl- or -alkenyl-alkyl radicals, such as cyclopentyl- or cyclohexenyl-methyl, -ethyl or -propyl radicals, aralkyl- or aralkenyl- such as phenyl-methyl, -ethyl, -vinyl or -propyl radicals or aryl radicals, more especially phenyl radicals. Suitable heterocyclic or heterocyclic-aliphatic radicals are above all mono-nuclear ones, such as (if desired wholly or partially hydrogenated) pyridyl, pyrimidyl, pyridazyl, pyrazyl, furyl or thienyl groups and corresponding heterocyclyl-alkyl radicals, such as pyridyl-, furyl-, or thienyl-methyl or -ethyl radicals.

As substituents of the aforementioned aliphatic radicals there may be mentioned more especially free or substituted hydroxyl, mercapto or amino groups in which the substituents are preferably of aliphatic nature, for example lower alkoxy, alkylmercapto or mono- or dialkyl- or cycloalkyl-amino groups, alkyleneamino, oxaalkyleneamino, azaalkyleneamino or thialkyleneamino groups, such as methyl-, ethyl-, propyl-, butyl-, pentyl- or hexyl-oxy or -mercapto groups, methyl-, dimethyl-, ethyl-, diethyl-, propyl-, dipropyl-, N-methyl-N-propyl-, N-methyl-N-cyclopropyl-, butyl-, dibutyl-amino groups, pyrrolidino, piperidino, morpholino or piperazino groups, for example the piperazino, N-methylpiperazino or N-hydroxyethyl-piperazino group, or a corresponding aminoalkylamino group.

The aliphatic radicals may also be substituted by halogen atoms such as chlorine, bromine or iodine, the pseudohalogen trifluoromethyl, nitro groups, free or functionally converted carboxyl groups such as cyano, carbalkoxy or carbamyl groups, guanidino, ureido or thioureido groups, oxo, thiono or imino groups.

The alicyclic radicals may contain above all lower alkyl radicals.

Aromatic or heterocyclic radicals may contain above all halogen atoms or the above mentioned free or substituted hydroxyl, mercapto or amino groups, alkyl- or alkylenedioxy, nitro groups or free or converted carboxyl groups. In the alicyclic-aliphatic, araliphatic and heterocyclic-aliphatic radicals both components may be substituted as described above.

When an oxo group is attached to the α-carbon atom of a substituting radical, the radical is that of a carboxylic acid, above all of a lower fatty acid, aralkane-carboxylic acid, heterocyclyl-alkane-carboxylic acid, aromatic or heterocyclic carboxylic acids which may be substituted in the manner described above. Particular mention deserve the acetic, propionic or butyric acid or substituted or unsubstituted benzoic or phenylacetic acids.

The heterocyclic nuclei which may be hydrogenated may be further C-substituted, for example by halogen atoms, nitro, nitroso, free or substituted hydroxyl, mercapto or amino groups or free or functionally converted carboxyl groups, oxo, thiono or imino groups such, for example as those mentioned above or by a further carboxylic acid-N'-[5-nitrofuryl-(2)-methylidene]-hydrazide group.

Finally, the new compounds may also be substituted for example at the hydrazide nitrogen, above all by one of the aforementioned substituted or unsubstituted hydrocarbon or heterocyclic groups, more especially by alkyl.

Quaternary ammonium derivatives are above all the alkyl or benzyl ammonium compounds of tertiary bases.

Suitable pyridazine-carboxylic acids are especially those of the formula

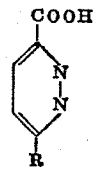

in which R represents a hydrogen or halogen atom or an aryl or alkoxy group or a tertiary aminoalkoxy group, such as a dialkylamino-, pyrrolidino-, piperidino-, morpholino- or piperazino-ethyl- or -propyl-oxy or suitable free or substituted amino groups, for example those mentioned above; or those of the formula

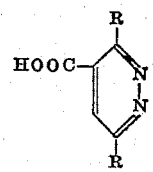

in which R represents a hydrogen atom or an aryl or an alkoxy, amino or tertiary aminoalkoxy group, for example one of those mentioned above; or those of the formula

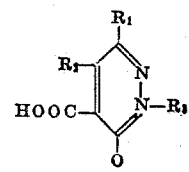

in which $R_1$ and $R_2$ represent substituted or unsubstituted hydrocarbon radicals, for example alkyl or aryl or together may also represent a fused-on ring; $R_3$ represents a hydrogen atom or an alkyl, aryl, pyridyl or aminoalkyl radical; or those of the formula

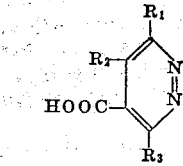

in which $R_1$ or $R_2$ have the meaning defined in the preceding formula, and $R_3$ represents a halogen atom or a free or etherified hydroxyl group, for example an alkoxy or tertiary amino-alkoxy, or a free or substituted amino group such for example as those mentioned above; or those of the formula

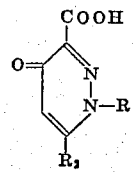

in which R represents an aryl or pyridyl radical and $R_2$ a lower alkyl radical.

There may be mentioned for example:

Pyridazine-3-carboxylic acid,
6-phenylpyridazine-3-carboxylic acid,
3-phenyl-6-pyridazone-5-carboxylic acid,
6-pyridazone-3-carboxylic acid,
6-methoxy-, ethoxy- or propoxy-pyridazine-3-carboxylic acid,
6-($\beta$-dimethylamino-, dimethylamino-, pyrrolidino-, morpholino-, piperidino- or piperazino-ethoxy)-pyridazine-3-carboxylic acid, pyridazine-4-carboxylic acid,
3:6-bis-($\beta$-diethylamino-, dimethylamino-, pyrrolidino-, morpholino-, piperidino- or piperazino-ethoxy)-pyridazine-4-carboxylic acid,
3:6-bis-methoxy-, ethoxy- or propoxy-pyridazine-4-carboxylic acid,
Pyridazine-3:6-dicarboxylic acid,
5:6-diphenylpyridazone-(3)-4-carboxylic acid,
2:5:6-triphenylpyridazone-(3)-4-carboxylic acid,
5:6-dimethylpyridazone-(3)-4-carboxylic acid,
5-phenyl-6-methylpyridazone-(3)-4-carboxylic acid,
5:6-di-para-chlorophenylpyridazone-(3)-4-carboxylic acid,
5:6-cyclohexanopyridazone-(3)-4-carboxylic acid,
2:5:6-trimethylpyridazone-(3)-4-carboxylic acid,
2-methyl-5:6-diphenylpyridazone-(3)-4-carboxylic acid,
2 - methyl-5:6-di-para-chlorophenylpyridazone-(3)-4-carboxylic acid,
3-pyridazone-4-carboxylic acid,
2-methylpyridazone-(3)-4-carboxylic acid,
2-ethyl-5:6-dimethylpyridazone-(3)-4-carboxylic acid,
2:6-dimethyl-5-phenylpyridazone-(3)-4-carboxylic acid,
2-($\beta$-dimethylamino-, diethylamino-, pyrrolidino-, piperidino-, morpholino-, piperazino-ethyl)-5:6-H, dimethyl- or diphenyl-pyridazone-(3)-4-carboxylic acid,
3:4-H or dimethyl-6-chloropyridazine-5-carboxylic acid,
3:4-diphenyl-6-chloropyridazine-5-carboxylic acid,
3:4-H, dimethyl- or diphenyl-6-methoxy-, ethoxy-, dimethylamino-, diethylamino-, pyrrolidino-, piperidino-, morpholino-, piperazino-pyridazine-5-carboxylic acid, or
3:4-H, methyl- or phenyl-6-($\beta$-diethylamino-, dimethylamino-, pyrrolidino-, morpholino-, piperidino- or piperazino-ethoxy)-pyridazine-5-carboxylic acid,
1-phenyl-, halogenophenyl-, nitrophenyl-, pyridyl-(2)-6-methyl- or -ethyl-pyridazone-(4)-3-carboxylic acid.

As pyrimidine-carboxylic acids may be mentioned, for example, those of the formula

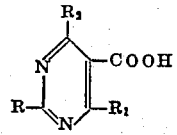

in which R, $R_1$ and $R_2$ represent free or substituted hydroxyl, amino or mercapto groups, for example as indicated above, hydrogen, halogen atoms or lower alkyl radicals, or those of the formula

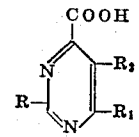

in which R, $R_1$ and $R_2$ stand for hydrogen or lower alkyl radicals. Examples of such acids are pyrimidine-4-carboxylic acid, 5-methyl-pyrimidine-4-carboxylic acid, 6-methyl - pyrimidine - 4-carboxylic acid, pyrimidine-5-carboxylic acid, orotic acid, 2:4-diamino-pyrimidine-5-carboxylic acids, 2-hydroxy-4-amino-pyrimidine-5-carboxylic acids, 2:4-diamino-pyrimidine-6-carboxylic acid and, if desired, their N-substitution products.

The new compounds display a valuable antibacterial action, more especially towards cocci. They are also effective against trypanosomes, trichomonads or amoebae. They can therefore be used as chemotherapeuticals, for example for treating streptococcal, staphylococcal or protozoan infections in animals or humans. They are also active against colibacteria and can be used as urine-disinfectants. They can also be used as intermediates for the manufacture of medicaments.

Especially valuable are compounds of the formula

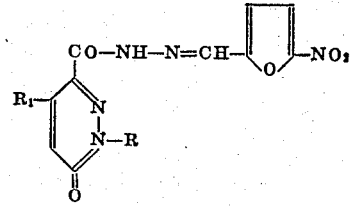

and if desired their salts; in this formula R represents an alkyl, cycloalkyl, hydroxyalkyl, alkoxyalkyl, halogenoalkyl or tertiary aminoalkyl radical whose alkylene chains contain two to four carbon atoms, or it represents a phenyl, benzyl or pyridyl radical, and $R_1$ represents a hydrogen atom or a hydroxyl group. The tertiary amino group is above all a di-lower alkylamino or alkyleneamino, oxaalkyleneamino or azaalkyleneamino group, more especially a dimethylamino, diethylamino, pyrrolidino, piperidino, morpholino, piperazino or N-alkylpiperazino group. The phenyl or benzyl radicals may contain lower alkoxy, alkylmercapto, alkyl-, alkylenedioxy groups and/or halogen atoms. Of special value among these compounds are those of the formula

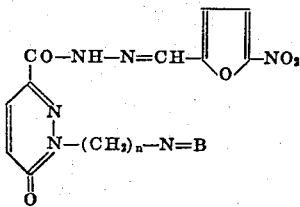

and their salts. In this formula N=B represents a lower dialkylamino, morpholino, piperazino, pyrrolidino or piperidino group; $n=2$ or 3. Special mention deserve 1 - ($\beta$-diethylaminoethyl)-6-oxo-1:6-dihydropyridazine-3-carboxylic acid-(5'-nitro-2'-furfurylidene)-hydrazide and its salts and 1-(β-morpholinoethyl)-6-oxo-1:6-dihydropyridazine-3-carboxylic acid-(5'-nitro-2'-furfurylidene)-hydrazide and its salts.

The new compounds are prepared by methods known per se. Advantageously a hydrazide of a monocyclic six membered diazine carboxylic acid whose ring nitrogen atoms are separated by at most 1 carbon atom is condensed with a 5-nitrofuran-(2)-carbonyl compound, more especially with 5-nitrofuran-2-aldehyde, to form the hydrazone. This condensation is likewise carried out in the usual manner, and the carbonyl group may also be in a reactively converted form. Thus it is possible to use, for example, acetals, thioacetals, oximes, bisulphite compounds or acylates of the carbonyl compounds.

The aforementioned reaction is preferably carried out in the presence of diluents, and with heating.

The starting materials are known or, inasmuch as they are new, can be made by methods known per se. If desired, they may be used in the form of salts thereof. 1-tertiary aminoalkyl-6-oxo-1:6-dihydropyridazine-3-carboxylic acid hydrazides, 2-amino or 2-aminoalkyl-amino-4-hydroxy or amino-pyrimidine-5-carboxylic acid hydrazides as well as their salts, are new and form another object of the present invention. They are obtained in the usual manner, for example by reacting a suitable carboxylic acid or a reactive derivative thereof with hydrazine. The other new starting materials likewise form an object of the invention.

Depending on the reaction conditions and starting materials used the new compounds are obtained in the free form or in the form of salts thereof. The salts of the new compounds can be converted in the known manner into the free compounds, acid addition salts, for example, by reaction with a basic agent, or a metal salt if desired by reaction with an acid. On the other hand, a resulting acid compound can be converted into a salt by treatment with a basic agent, for example with a hydroxide or carbonate of an alkali metal such as sodium hydroxide or potassium carbonate; or a resulting free base on the other hand can be made into a salt with an inorganic or organic acid. Acid addition salts are advantageously prepared with therapeutically useful acids, for example hydrohalic acids, for example hydrochloric or hydrobromic acid, perchloric acid, nitric or thiocyanic acid, sulfuric or phosphoric acids, or organic acids such as formic, acetic, propionic, glycollic, lactic, pyruvic, oxalic, malonic, succinic, maleic, fumaric, malic, tartaric, citric, ascorbic, hydroxymaleic, dihydroxymaleic, benzoic, phenylacetic, 4-aminobenzoic, 4-hydroxybenzoic, anthranilic, cinnamic, mandelic, salicylic, 4-aminosalicylic, 2-phenoxybenzoic, 2-acetoxybenzoic, methanesulfonic, ethanesulfonic, hydroxyethanesulfonic, benzenesulfonic, para-toluenesulfonic, naphthalenesulfonic or sulfanilic acid, or methionine, tryptophan, lysine or arginine. The salts may be mono-salts or poly-salts.

When a resulting compound contains tertiary amino groups it can be converted by a known method into a quaternary ammonium compound, more especially by reaction with an alkyl- or benzyl-halide, -sulfate or -sulfonate such, for example, as methyl-, ethyl-, or propyl-chloride, -bromide or iodide, or with a dialkyl sulfate, for example dimethyl sulfate or diethyl sulfate. Quaternary ammonium salts can also be converted into ammonium hydroxides, for example by the action of freshly precipitated silver oxide on an ammonium halide, or by the action of barium hydroxide solution on an ammonium sulfate; from these ammonium salts other ammonium salts can be prepared by reaction with acids, for example with those mentioned above.

The new compounds are intended to be used as medicaments in the form of pharmaceutical preparations containing them in admixture with an organic or inorganic solid or liquid pharmaceutical vehicle suitable for local, enteral (for example oral) or parenteral administration. Suitable vehicles are substances that do not react with the new compounds, such for example as water, gelatine, lactose, starches, magnesium stearate, talc, vegetable oils, benzyl alcohols, gums, polyalkylene glycols, white petroleum jelly, cholesterol or other known medicinal vehicles. The pharmaceutical preparations may be, for example, tablets, dragees, capsules, or in liquid form, solutions, suspensions or emulsions. They may be sterilized and/or may contain assistants such as preservatives, stabilisers, wetting agents or emulsifiers, salts for regulating the osmotic pressure or buffers. They may also contain other therapeutically valuable substances. The new compounds may also be used as additives to animal feeds or in veterinary medicine.

The following examples illustrate the invention:

*Example 1*

A solution of 5.8 grams of 1-(β-diethylaminoethyl)-6-oxo-1:6-dihydropyridazine-3-carboxylic acid hydrazide hydrochloride in 200 cc. of alcohol is treated with 2.82 grams of 5-nitrofuran-2-aldehyde in 60 cc. of alcohol and the mixture is refluxed for 15 minutes. Upon cooling, 1-(β-diethylaminoethyl)-6-oxo-1:6-dihydropyridazine-3-carboxylic acid-(5'-nitro-2'-furfurylidene)-hydrazide hydrochloride melting at 246° C. with decomposition of the formula

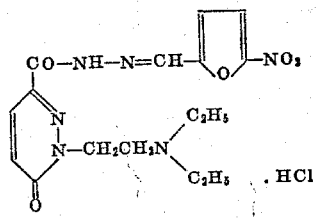

separates out.

1-(β-diethylaminoethyl)-6-oxo-1:6-dihydropyridazine-3-carboxylic acid hydrazide hydrochloride used as starting material is prepared in the following manner:

15.4 grams of 6-oxo-1:6-dihydropyridazine-3-carboxylic acid methyl ester in 60 cc. of methanol are treated with a solution 2.3 grams of sodium in 80 cc. of methanol and then with 14 grams of chloroethyl-diethylamine in 40 cc. of methanol. The mixture is refluxed for 4 hours and allowed to cool, the precipitated crystals are suctioned off, and the filtrate is evaporated to dryness. The residue is crude 1-(β-diethylaminoethyl)-6-oxo-1:6-dihydropyridazine-3-carboxylic acid methyl ester; it is boiled under reflux for one hour in 80 cc. of methanol with 10 grams of hydrazine hydrate, then evaporated in vacuo and the residue is boiled with ether. Evaporation of the ethereal solution yields 1-(β-diethylaminoethyl)-6-oxo-1:6-dihydropyridazine-3-carboxylic acid hydrazide of the formula

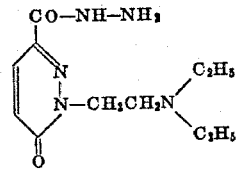

melting at 115–116° C.

Its hydrochloride, melting at 169–171° C., is obtained by dissolving the base in absolute alcohol and treating the solution with ethanolic hydrochloric acid.

*Example 2*

A solution of 6.04 grams of 1-(β-morpholinoethyl)-6-oxo-1:6-dihydropyridazine-3-carboxylic acid hydrazide hydrochloride in 320 cc. of aqueous alcohol of 94% strength is treated with 2.82 grams of 5-nitrofuran-2-aldehyde in 60 cc. of alcohol and the mixture is refluxed for 10 minutes. Upon cooling, 1-(β-morpholinoethyl)-6-oxo- 1:6-dihydropyridazine-3-carboxylic acid-(5'-nitro-2'-furfurylidene)-hydrazide hydrochloride of the formula

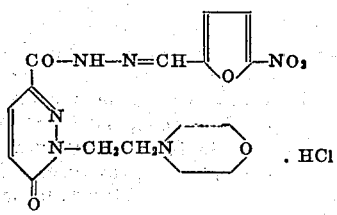

separates out; it melts at 266–268° C. with decomposition.

1-(β-morpholinoethyl)-6-oxo-1:6-dihydropyridazine-3-carboxylic acid hydrazide hydrochloride used as starting material is prepared in the following manner:

A solution of 2.3 grams of sodium in 200 cc. of methanol is treated with 15.4 grams of 6-oxo-1:6-dihydropyridazine-3-carboxylic acid methyl ester and then with a methanolic solution of 16.4 grams of β-morpholinoethyl-chloride. The mixture is refluxed for 2 hours and then allowed to cool, and the precipitated crystals are suctioned off, and the filtrate is evaporated to dryness. The residue is crude 1-(β-morpholinoethyl)-6-oxo-1:6-dihydropyridazine-3-carboxylic acid methyl ester which is boiled in 80 cc. of methanol with 10 grams of hydrazine hydrate for 1½ hours under reflux and then evaporated in vacuo. The residue is recrystallized from alcohol, the precipitated crystals are again dissolved in alcohol, and the solution is adjusted with alcoholic hydrochloric acid to pH 6, whereupon 1-(β-morpholinoethyl)-6-oxo-pyridazine-3-carboxylic acid hydrazide hydrochloride of the formula

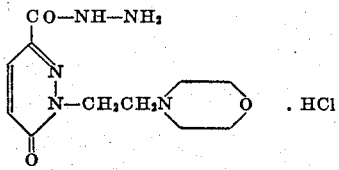

separates out; it melts at 222–224° C.

Example 3

A boiling solution of 4.5 grams of 2-(β-diethylaminoethylamino)-4-hydroxypyrimidine-5-carboxylic acid hydrazide and 4.5 grams of 5-nitrofuran-2-aldehyde in 200 cc. of ethanol is treated with 50 cc. of 10 N-ethanolic hydrochloric acid. On cooling, crystalline 2-(β-diethylamino-ethylamino)-4-hydroxy-pyrimidine-5-carboxylic acid-N'-(5-nitro-2-furfurylidene)-hydrazide hydrochloride of the formula

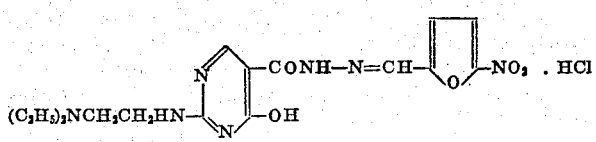

crystallizes in yellow prisms melting at 197–199° C.

2-(β-diethylamino-ethylamino)-4-hydroxypyrimidine-5-carboxylic acid hydrazide used as starting material is prepared in the following manner:

A mixture of 15 grams of 2-methylmercapto-4-hydroxy-5-carbethoxypyrimidine and 50 cc. of diethylaminoethylamine is heated for 2 hours in an autoclave at 150° C., then allowed to cool and treated with 100 cc. of ether, whereupon crystallization sets in slowly, to yield the diethylamino-ethyl ammonium salt of 2-diethylamino-ethylamino-4-hydroxy-5-carbethoxy-pyrimidine of the formula

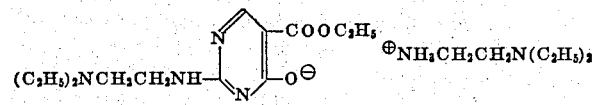

which melts at 152–154° C. after having been recrystallized from methylene chloride+diethyl ether.

A mixture of 10 grams of the aforementioned compound, 50 cc. of anhydrous hydrazine and 25 cc. of alcohol is heated for 7 hours at 100° C., then evaporated to dryness, and the residue is recrystallized from ethanol, to yield 2-(β-diethylamino-ethylamino)-4-hydroxypyrimidine-5-carboxylic acid hydrazide of the formula

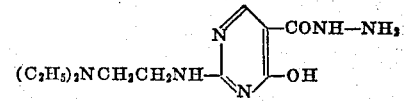

in crystals melting at 198° C.

Example 4

3.0 g. of 5-nitrofuran-2-aldehyde in 20 cc. of ethanol are added to a solution of 4.0 g. of 2-(N-methyl-piperazino)-4-amino-pyrimidine-5-carboxylic acid hydrazide in 25 cc. of ethanol and 10 cc. of 5 N-hydrochloric acid. On cooling, a yellow precipitate is formed which is purified by recrystallization from a mixture of water and alcohol. There is obtained the 2-(N-methyl-piperazino)-4-amino-pyrimidine-5-carboxylic acid-N'-(5-nitro-2-furfurylidene)-hydrazide-hydrochloride hydrate of the formula

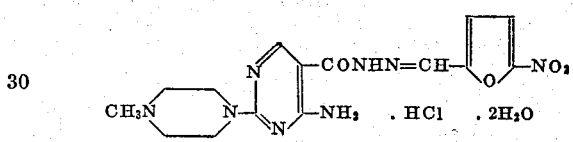

in the form of crystals melting at 242–245° C.

The 2-(N-methyl-piperazino)-4-amino-pyrimidine-5-carboxylic acid hydrazide used as starting material is prepared as follows:

10 g. of 2-(N-methl-piperazino)-4-amino-5-carbethoxypyrimidine and 20 cc. of anhydrous hydrazine in 20 cc. of ethanol are heated to the boil for 5 hours. On cooling, the 2-(N-methyl-piperazino)-4-amino-pyrimidine-5-carboxylic acid hydrazide of the formula

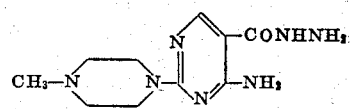

crystallizes. Melting point, 217–219° C.

Example 5

7.0 g. of 5-nitrofuran-2-aldehyde in 20 cc. of ethanol are added to a solution of 9.5 g. of 2-dimethylamino-4-amino-pyrimidine-5-carboxylic acid hydrazide in 100 cc. of an N-solution of hydrogen chloride in ethanol. 2-dimethylamino-4-amino-pyrimidine-5-carboxylic acid - N'-(5-nitro-2-furfurylidene)-hydrazide-hydrochloride of the formula

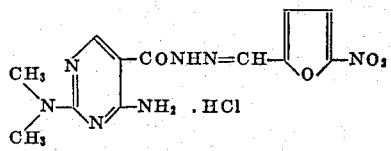

precipitates immediately. The compound melts and decomposes at 295° C.

The 2-dimethylamino-4-amino-pyrimidine-5-carboxylic acid hydrazide used as starting material is prepared as follows:

10 g. of 2-dimethylamino-4-amino-5-carbethoxypyrimidine and 50 cc. of hydrazine hydrate are heated to the boil for 7 hours. There is obtained in this manner the 2-dimethylamino-4-amino-pyrimidine-5-carboxylic acid hydrazide of the formula

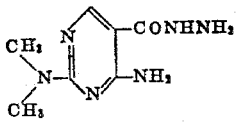

in the form of crystals which melt at 237–239° C.

*Example 6*

5.0 g. of 2-n-butylamino-4-amino-pyrimidine-5-carboxylic acid hydrazide are dissolved in 50 cc. of an N-alkaline solution of hydrogen chloride. To the resulting solution are added 4.0 g. of 5-nitrofuran-2-aldehyde in 20 cc. of ethanol after which 2-n-butylamino-4-amino-pyrimidine - 5-carboxylic acid-N'-(5-nitro-2-furfurylidene)-hydrazide-hydrochloride of the formula

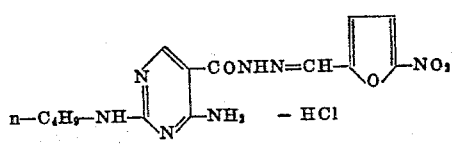

forms as a yellow precipitate which melts at 253–254° C.

The 2-n-butylamino - 4 - aminopyrimidine-5-carboxylic acid hydrazide used as starting material is prepared as follows:

20 g. of 2-n-butylamino-4-amino-5-carbethoxy-pyrimidine and 50 cc. of anhydrous hydrazine in 25 cc. of ethanol are heated to the boil for 6 hours. On cooling, the 2 - n - butylamino - 4-amino-pyrimidine-5-carboxylic acid hydrazide of the formula

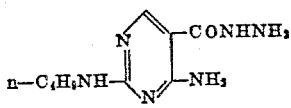

precipitates in the form of crystals which melt at 164–165° C.

What is claimed is:

1. The 5-nitro-furyl-(2)-methylidene-hydrazide of a member selected from the group consisting of acids of the formulae

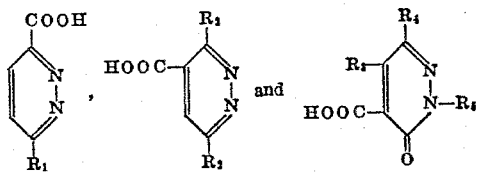

in which $R_1$ represents a member selected from the group consisting of hydrogen, phenyl, lower alkoxy and lower dialkylamido-, pyrrolidino-, morpholino-, piperidino- and piperazino-ethoxy, $R_2$ represents a member selected from the group consisting of hydrogen, lower alkoxy and di-lower alkylamino-, pyrrolidino-, morpholino-, piperidino- and piperazino-ethoxy, $R_3$ represents a member selected from the group consisting of hydrogen, lower alkyl, phenyl and halogenophenyl, $R_4$ represents a member selected from the group consisting of phenyl, hydrogen, lower alkyl and halogenophenyl, $R_5$ represents a member selected from the group consisting of hydrogen, lower alkyl and di-lower alkylamino-, pyrrolidino-, piperidino-, morpholino- and piperazino-ethyl, and of the 2:4-di-amino-pyrimidine-6-carboxylic acid.

2. Therapeutically acceptable acid addition salts of compounds claimed in claim 1.

3. A member selected from the group consisting of quaternary alkyl and benzyl ammonium salts of the compounds claimed in claim 1.

4. A member selected from the group consisting of compounds of the formula

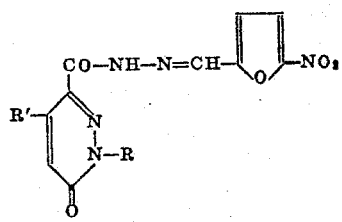

in which formula R stands for a member selected from the group consisting of alkyl, cycloalkyl, hydroxyalkyl, alkoxyalkyl, halogenalkyl and tertiary aminoalkyl radicals, the alkylene chain containing 2 to 4 carbon atoms, and a phenyl, benzyl and pyridyl radical and R' represents a member selected from the group consisting of hydrogen and hydroxyl, and therapeutically acceptable acid addition salts thereof.

5. A member selected from the group consisting of compounds of the formula

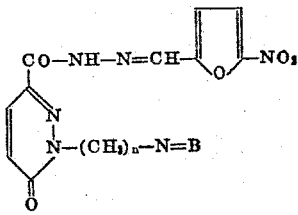

and their therapeutically acceptable salts, in which formula N=B stands for a member selected from the group consisting of lower dialkylamino, pyrrolidino, piperidino, morpholino and piperazino groups and $n$ for an integer from 2 to 3.

6. A member selected from the group consisting of the 5-nitro-furyl-(2)-methylidene hydrazide of an acid of the formula

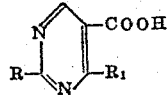

in which R stands for a member selected from the group consisting of hydrogen, amino and hydroxy, and $R_1$ stands for a member selected from the group consisting of hydrogen and amino, and therapeutically acceptable acid addition salts thereof.

7. A member selected from the group consisting of 1 - (β - diethylamino - ethyl) - 6 - oxo-1:6 - dihydro-pyridazine - 3 - carboxylic acid - (5' - nitro - 2' - furfurylidene) hydrazide and its therapeutically acceptable acid addition salts.

8. A member selected from the group consisting of 1 - (β - morpholino - ethyl) - 6 - oxo - 1:6-dihydro - pyridazine-3-carboxylic acid-(5'-nitro-2'-furfurylidene)-hydrazide and its therapeutically acceptable acid addition salts.

9. A member selected from the group consisting of 2 - (β - diethylamino - ethylamino) - 4 - hydroxy - pyrimidine-5-carboxylic acid - N - (5-nitro-2-furfurylidene)-hydrazide and its therapeutically acceptable acid addition salts.

10. A member selected from the group consisting of 2 - (N - methyl - piperazino) - 4 - amino - pyramidine - 5-carboxylic acid-(5-nitro-furfurylidene)-hydrazide and its therapeutically acceptable acid addition salts.

11. A member selected from the group consisting of 2 - n - butylamino - 4 - amino - pyramidine - 5 - carboxylic acid-(5-nitro-furfurylidene) hydrazide and its therapeutically acceptable acid addition salts.

12. A member selected from the group consisting of 2 - dimethylamino - 4 - amino - pyrimidine - 5 - carboxylic acid-5-(nitro-furfurylidene)-hydrazide and its therapeutically acceptable acid addition salts.

References Cited by the Examiner

UNITED STATES PATENTS

| | | | |
|---|---|---|---|
| 2,746,960 | 5/1956 | Gever et al. | 260—240 |
| 2,922,787 | 1/1960 | Ferguson | 260—256.4 |
| 2,927,112 | 3/1960 | Steck | 260—250 |

OTHER REFERENCES

Ballard et al.; J. Am. Chem. Soc., vol. 64, page 794 (1942).

Carrara et al.: Gazz. Chim. Ital., vol. 82, pages 652–661 (1952).

Chemical Abstracts, volume 51, column 15790 (1957) (abstract of Yamaguchi et al., Am. Rept. Shionogi Research Lab., volume 7, pages 123–8 (1957)).

Chemical Abstracts, volume 52, column 1559 (1958) (abstract of Japanese Patent 349 (1957).

Chemical Abstracts, volume 52, col. 8212 (1958) (abstract of Japanese Patent 4726 (1957)).

Chemical Abstract, vol. 51, columns 5897 to 5899 (1957) (abstract of Ozawa, Kyoto Daigaku Kekkaka-Kenkyusho Nempo, vol. 4, pages 265–299 (1946)).

Gardner et al.: J. Org. Chem., volume 21, pages 531–2 (1956).

Kakemi et al.: J. of Pharm. Soc. of Japan, vol. 81, pp. 1609 to 1614 (Nov. 1961).

Kushner et al.: J. Am. Chem. Soc., vol. 74, pages 3617 to 3621 (1952).

Roba Annales Pharm. Franc., vol. 18, page 519 (1960).

Yale et al.: J. Am. Chem. Soc., volume 75, pages 1933–7 (1953).

WALTER A. MODANCE, *Primary Examiner.*

DUVAL T. McCUTCHEN, NICHOLAS S. RIZZO, *Examiners.*

JOHN D. RANDOLPH, *Assistant Examiner.*

UNITED STATES PATENT OFFICE
CERTIFICATE OF CORRECTION

Patent No. 3,234,219                        February 8, 1966

Paul Schmidt et al.

It is hereby certified that error appears in the above numbered patent requiring correction and that the said Letters Patent should read as corrected below.

Column 10, lines 23 to 31, for that portion of the formula reading "$-(CH_3)_n-N=B$" read -- $-(CH_2)_n-N=B$ --.

Signed and sealed this 7th day of February 1967.

(SEAL)
Attest:

ERNEST W. SWIDER                        EDWARD J. BRENNER
Attesting Officer                        Commissioner of Patents